(12) United States Patent
Das et al.

(10) Patent No.: US 10,257,847 B2
(45) Date of Patent: Apr. 9, 2019

(54) SMALL CELL AND COMMUNICATION NETWORK RECONFIGURATION BASED ON WIRELESS DEVICE CAPABILITIES

(71) Applicant: QUALCOMM Incorporated, San Diego, CA (US)

(72) Inventors: Soumya Das, San Diego, CA (US); Edwin Chongwoo Park, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/010,402

(22) Filed: Jan. 29, 2016

(65) Prior Publication Data

US 2017/0223723 A1 Aug. 3, 2017

(51) Int. Cl.
*H04W 72/12* (2009.01)
*H04W 72/04* (2009.01)
*H04W 72/08* (2009.01)

(52) U.S. Cl.
CPC ..... *H04W 72/1205* (2013.01); *H04W 72/044* (2013.01); *H04W 72/048* (2013.01); *H04W 72/0453* (2013.01); *H04W 72/087* (2013.01)

(58) Field of Classification Search
CPC ........... H04W 72/1205; H04W 72/044; H04W 72/04; H04W 72/12; H04W 76/00;
(Continued)

(56) References Cited

U.S. PATENT DOCUMENTS 8,934,885 B2 1/2015 Yoo et al.
8,976,743 B2 * 3/2015 Jang ...................... H04L 1/1896
370/329
(Continued)

FOREIGN PATENT DOCUMENTS

WO WO-2014140667 A1 9/2014

OTHER PUBLICATIONS

Partial International Search Report and Written Opinion—PCT/US2016/065098—ISA/EPO—dated Mar. 10, 2017.
(Continued)

*Primary Examiner* — Kibrom T Hailu
(74) *Attorney, Agent, or Firm* — Qualcomm IP Dept.; James Hunt Yancey, Jr.

(57) ABSTRACT

Aspects of the present disclosure provide a scheduling entity and methods of operating the scheduling entity such that the scheduling entity reconfigures/allocates its resources based on device capabilities of the wireless devices. The scheduling entity utilizes a first resource configuration to provide communications service to one or more wireless devices associated with the scheduling entity. The scheduling entity determines a change of the one or more wireless devices, wherein the change include at least one of a capability change of a wireless device, a quality of service (QoS) requirement change of a wireless device, an addition of a wireless device, or a removal of a wireless device. Based on at least one of a predetermined time of a day or the determined change, the scheduling entity reconfigures to a second resource configuration to facilitate resource utilization of the first wireless cell.

34 Claims, 10 Drawing Sheets

(58) Field of Classification Search
CPC ..... H04L 5/006; H04L 47/805; H04L 1/0026; H04L 43/087; H04L 5/0032; H04L 43/0858; H04L 47/783; H04L 5/0053; H04L 5/001; H04L 1/20; H04L 41/0896; H04L 47/76; H04L 47/2433; H04L 41/5067; H04L 5/0057; H04J 2203/0069
See application file for complete search history.

(56) References Cited

U.S. PATENT DOCUMENTS

| | | | | |
|---|---|---|---|---|
| 2007/0189197 A1* | 8/2007 | Kwon | ............. | H04W 72/06 370/319 |
| 2009/0059852 A1* | 3/2009 | Skillermark | ......... | H04W 16/10 370/329 |
| 2012/0009935 A1* | 1/2012 | Wei | .............. | H04L 5/001 455/450 |
| 2012/0142361 A1 | 6/2012 | Zhao et al. | | |
| 2012/0155272 A1* | 6/2012 | Quan | .............. | H04L 5/003 370/235 |
| 2012/0176978 A1 | 7/2012 | Kim | | |
| 2012/0231741 A1* | 9/2012 | Wei | .............. | H04W 72/082 455/63.1 |
| 2013/0065600 A1 | 3/2013 | Lim | | |
| 2013/0094440 A1* | 4/2013 | Moshfeghi | ........... | H04W 88/06 370/328 |
| 2013/0201847 A1 | 8/2013 | Chincholi et al. | | |
| 2013/0269002 A1* | 10/2013 | Thalanany | ............. | H04L 12/66 726/4 |
| 2014/0141782 A1* | 5/2014 | Rantala | ............. | H04W 36/0066 455/436 |
| 2014/0198758 A1* | 7/2014 | Nimbalker | ........... | H04L 1/1822 370/329 |
| 2014/0198761 A1* | 7/2014 | Hooli | .................... | H04W 72/08 370/329 |
| 2014/0335869 A1 | 11/2014 | Choi et al. | | |
| 2015/0024737 A1* | 1/2015 | Fox | .................... | H04L 41/5025 455/425 |
| 2015/0148038 A1 | 5/2015 | Griot et al. | | |
| 2015/0173093 A1* | 6/2015 | Lie | ..................... | H04B 1/7117 370/329 |
| 2015/0181461 A1* | 6/2015 | Kim | .................... | H04W 74/08 370/236 |
| 2015/0195066 A1 | 7/2015 | Singh et al. | | |
| 2016/0007279 A1 | 1/2016 | Byun et al. | | |
| 2016/0176978 A1* | 6/2016 | Jaiswal | .............. | C07K 16/3046 424/136.1 |
| 2017/0141885 A1* | 5/2017 | Bontu | ................... | H04L 5/006 |

OTHER PUBLICATIONS

International Search Report and Written Opinion—PCT/US2016/065098—ISA/EPO—dated May 16, 2017.

* cited by examiner

SMALL CELL AND COMMUNICATION NETWORK RECONFIGURATION BASED ON WIRELESS DEVICE CAPABILITIES

TECHNICAL FIELD

The technology discussed below relates generally to wireless communication systems, and more particularly, to wireless cell reconfiguration. Reconfiguring cells, such as static cells (e.g., small cells) can dynamically allocate cell resources to provide optimal network operations for a given device's capability or a group of device's aggregate capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Non-limiting examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These radio access technologies have been adopted in various telecommunication standards to provide a common protocol that enables different wireless devices to communicate on a municipal, national, regional, and even global level. Some widely deployed examples of telecommunication standards are Universal Mobile Telecommunications System (UMTS) and Long Term Evolution (LTE). Both LTE and UMTS are standards promulgated by Third Generation Partnership Project (3GPP). Some examples of radio access technologies utilizing unlicensed spectrum are Wi-Fi, LTE-U (LTE in unlicensed spectrum), Bluetooth, ANT, NFC, etc.

A wireless cell (or its base station, Node B, eNode B, access point, etc.) may be equipped to support multiple radio access technology (RATs) and features associated with each RAT. In one example, a wireless cell may be capable of supporting various combinations of 2G, 3G, 4G, and/or 5G RAT. However, a wireless cell, particularly a small cell, may not have the resources to enable all supported RATs, bands, and features simultaneously. In general, a small cell can enable a subset of its RATs, bands, and features due to resource and/or platform limitations. Moreover, the optimal allocation of resources of the cell may change when wireless devices with different capabilities are associated with the cell at different times. Even when the wireless devices associated with the cell remain the same, the optimal allocation of resources of the cell (e.g., base station, Node B, eNode B, Home Node B (HNB), Home eNode B (HeNB), etc.) may be different when the quality of service (QoS) and/or other requirements (e.g., quality of service (QoS)) of the devices change individually or as a group.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a scheduling entity and methods of operating the scheduling entity such that the scheduling entity reconfigures/reallocates its resources based on device capabilities of the wireless devices. In one example, the scheduling entity may be a small cell. An aspect of the disclosure provides a method of operating a scheduling entity. The method utilizes, at a scheduling entity, a first resource configuration to provide communications service to one or more wireless devices associated with the scheduling entity. The method determines a change of the one or more wireless devices that includes at least one of a capability change of a wireless device, a quality of service (QoS) requirement change of a wireless device, an addition of a wireless device, or a removal of a wireless device. The method reconfigures the scheduling entity to a second resource configuration based on at least one of a predetermined time of a day or the determined change to facilitate resource utilization of the scheduling entity.

Another aspect of the disclosure provides a scheduling entity. In one example, the scheduling entity may be a base station of a wireless cell. The scheduling entity includes a communication interface configured to communicate with one or more wireless devices, a memory including executable code, and a processor operatively coupled to the communication interface and the memory. The processor is configured when executing the code, to utilize a first resource configuration to provide communications service to the one or more wireless devices associated with the scheduling entity. The processor is further configured to determine a change of the one or more wireless devices that includes at least one of a capability change of a wireless device, a quality of service (QoS) requirement change of a wireless device, an addition of a wireless device, or a removal of a wireless device. The processor is further configured to reconfigure the scheduling entity to a second resource configuration based on at least one of a predetermined time of a day or the determined change to facilitate resource utilization of the scheduling entity.

Another aspect of the disclosure provides scheduling entity. In one example, the scheduling entity may be a base station of a wireless cell. The scheduling entity includes means for utilizing a first resource configuration to provide communications service to one or more wireless devices associated with the scheduling entity. The scheduling entity further include means for determining a change of the one or more wireless devices that includes at least one of a capability change of a wireless device, a quality of service (QoS) requirement change of a wireless device, an addition of a wireless device, or a removal of a wireless device. The scheduling entity further includes means for reconfiguring to a second resource configuration based on at least one of a predetermined time of a day or the determined change to facilitate resource utilization of the scheduling entity.

Another aspect of the disclosure provides a computer-readable medium including executable code. The executable code causes a scheduling entity to utilize a first resource configuration to provide communications service to one or more wireless devices associated with the scheduling entity.

The executable code causes the scheduling entity to determine a change of the one or more wireless devices that includes at least one of a capability change of a wireless device, a quality of service (QoS) requirement change of a wireless device, an addition of a wireless device, or a removal of a wireless device. The executable code further causes the scheduling entity to reconfigure to a second resource configuration based on at least one of a predetermined time of a day or the determined change to facilitate resource utilization of the scheduling entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
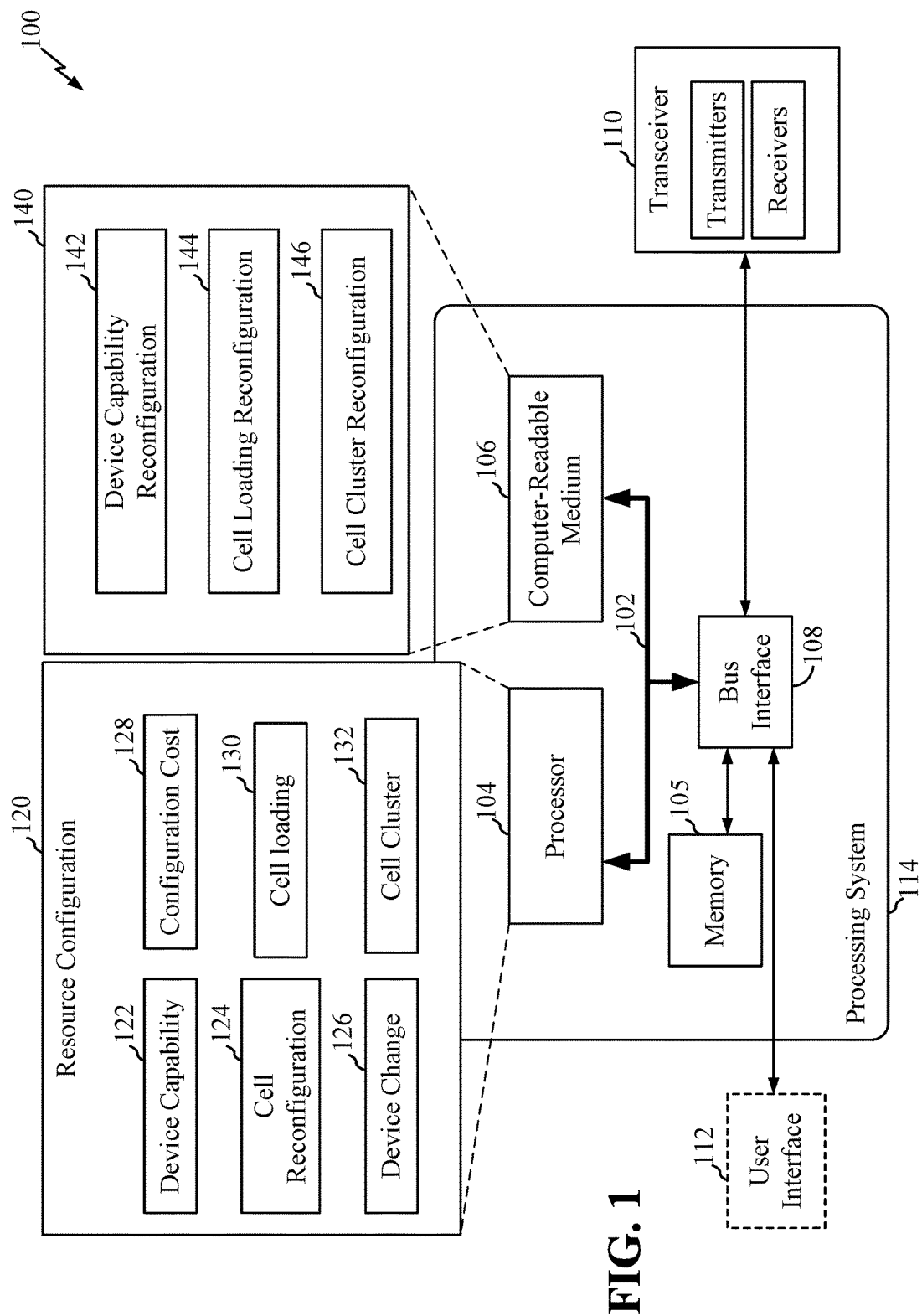
FIG. 1 is a diagram illustrating an example of a hardware implementation for an apparatus employing a processing system in accordance with an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, firmware, computer software, or any combination thereof. Whether such elements are implemented as hardware or software depends upon the particular application and design constraints imposed on the overall system.

Aspects of the present disclosure provide a scheduling entity and methods of reconfiguring the scheduling entity to improve or optimize its resource utilization based on the capabilities and quality of service (QoS) requirement of wireless devices associated with the scheduling entity. In some examples, the scheduling entity may be a wireless cell (e.g., a small cell) or any wireless device that can be configured as a scheduling entity. A small cell generally is implemented with low-powered radio access nodes that may operate in licensed and/or unlicensed spectrum. Small cells may also be known as pico cells, femtocells, and/or microcells. A small cell generally has a shorter communication range as compared to a macrocell. A macrocell generally provides the largest coverage area in a communications network (e.g., 3G/4G cellular networks). In various aspects of the present disclosure, a small cell may support multiple radio access technologies (RATs), for example, 2G, 3G, 4G, Wi-Fi, LTE-U, and others commonly used RATs. Similarly, a wireless device associated with wireless cell may support multiple RATs. However, due to resource limitations, a small cell may not have the resources to enable all RATs, bands, and various features at the same time. In one example, the small cell may have the capability to support features X, Y, and Z, separately or individually. However, the small cell does not have enough resources to support or enable features X, Y, and Z at the same time.

In general, a cell has more flexibility for reconfiguration when fewer user equipment (UEs) or wireless devices are associated with the cell, and/or the associated devices have similar capabilities (e.g., radio capability, RAT, band, etc.). Thus, the disclosed cell resource reconfiguration methods may be more beneficial in a small cell scenario. In one example, a small cell may support a handful of wireless devices (e.g., 8 devices or less), and device capabilities over time is likely to vary more in a small cell as compared to a macrocell. On the other hand, a macrocell generally is associated with a large number of wireless devices with diverse radio capabilities and QoS requirements at a given time. In addition, a macrocell generally has more resources than that of a small cell. However, this disclosure still may have applications in a macrocell during off-peak hours (fewer associated devices) or for capacity-limited macrocells.

In various aspects of the disclosure, a small cell may reconfigure or reallocate its resources to match the capabilities and QoS requirements of the associated wireless devices based on certain criteria in order to improve resource utilization. In some examples, the resources may include frequency spectrum resources and limitation that the operator of the network may consider during optimization of the network including the small cell and other cells. In this present disclosure, the small cell may perform the reconfiguration or reallocation of its resources without receiving a specific reconfiguration request from an associated wireless device or a neighbor wireless cell. While various aspects of the present disclosure are described in relation to a small cell as an illustrative example, the described concepts and features of the present disclosure may be extended to any suitable cell, including larger cells such as macrocells.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a scheduling entity or a base station as illustrated in any one or more of FIGS. 2, 3, 8 and/or 10. In some examples, the apparatus 100 may be a wireless device as illustrated in any one or more of FIGS. 2 and/or 3. In one particular example, the apparatus 100 may be a base station of a small cell. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes and functions described below and illustrated in FIGS. 3-10. In some examples, a group of cells, each implemented by the apparatus 100, may perform the processes and functions described and illustrated in FIGS. 3-10. In another example, a central element of a wireless communication network, implemented by the apparatus 100, may perform the processes and functions described and illustrated in FIGS. 3-10.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 (a communications interface) provides a means for communicating with various other apparatuses or devices over a transmission medium. The transceiver 110 may include one or more transmitters and receivers configured to transmit/receive signals utilizing a number of radio access technologies. In some examples, the transceiver 110 may include multiple radio chains (2 or more) each including a transmitter and/or a receiver. Depending upon the nature of the apparatus, a user interface 112 (e.g., keypad, display, speaker, microphone, joystick) may also be provided.

The processor 104 may include a resource configuration block 120 that may be configured to perform various functions, procedures, algorithms, and processes described in FIGS. 3-10. In one example, the resource configuration block 120 includes a device capability determination block 122, a cell reconfiguration block 124, a device change determination block 126, a configuration cost block 128, a cell loading block 130, and a cell cluster configuration block 132. In some scenarios, the resource configuration block 120 can be implemented via a dynamic memory capable of holding device operational states. In still yet some scenarios, there may be multiple blocks that can be utilized at varying times depending on operational aspects.

The resource configuration block's 120 features can have varying operational and structural arrangements. The device capability determination block 122 may be configured to determine the capability of a wireless device associated with a wireless cell as described in relation to FIG. 3. The cell reconfiguration block 124 may be configured to perform the cell resource reconfiguration and/or reallocation procedures as described in relation to FIGS. 4-7, 9, and 10. The device change determination block 126 may be configured to determine or detect various changes of wireless devices associated with a wireless cell as described in relation to FIGS. 4 and 5. The configuration cost block 128 may be configured to determine the cost of a device configuration or resource allocation as described in relation to FIG. 6. In one example, the cost may be determined based on one or more parameters including radio condition (e.g., interference), coexistence (e.g., concurrent RATs), and QoS changes (e.g., QoS degradation or QoS improvement) of the wireless devices due to a certain resource configuration and/or allocation. A new resource configuration may cause the QoS of a wireless device to improve or degrade. The cell loading block 130 may be configured to determine a cell loading as described in relation to FIGS. 7 and 8. The cell cluster configuration block 132 may be configured to perform cell cluster communications and procedures as described in relation to FIGS. 9 and 10.

The processor 104 is responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

In one aspect of the disclosure, the computer-readable medium 106 (e.g., a non-transitory computer-readable medium) may store executable code 140 that configures the resource configuration block 120 to perform the functions and procedures described in relation to FIGS. 3-10. For example, the code 140 may include device capability reconfiguration routine 142, cell loading reconfiguration routine 144, and cell cluster reconfiguration routine 146. The device capability reconfiguration routine 142 may configure the apparatus 100 to perform the wireless cell reconfiguration procedure based on device capability of FIG. 4. The cell loading reconfiguration routine 144 may configure the apparatus 100 to perform the cell reconfiguration procedure based on cell loading of FIG. 7. The cell cluster reconfiguration routine 146 may configure the apparatus 100 to perform the cell cluster reconfiguration procedure of FIG. 9. The different routines of the executable code 140 may be executed individually or in any combinations including some or all of the routines.

Figure 2:
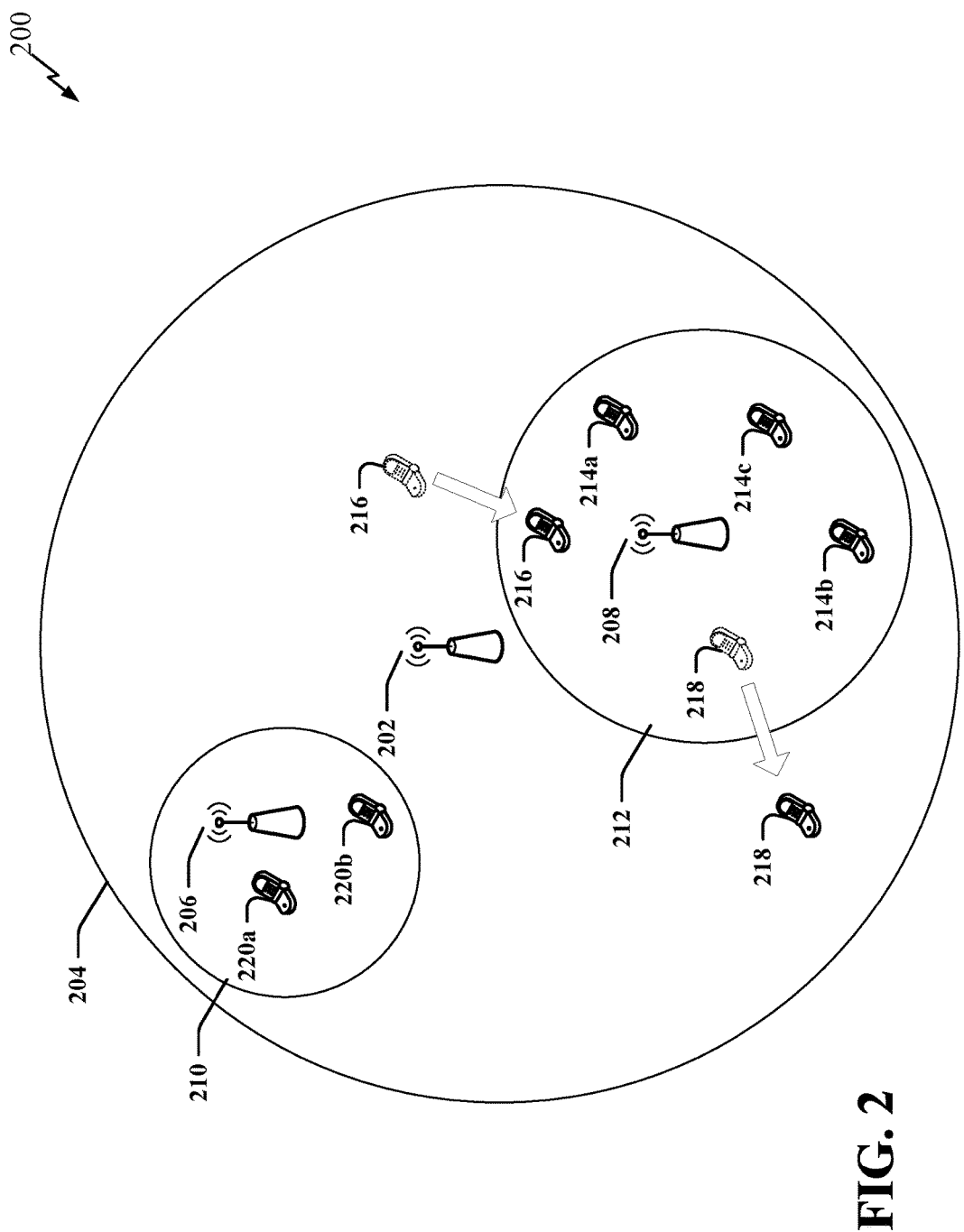
FIG. 2 is a diagram illustrating an example of a wireless communications network in accordance with an aspect of the disclosure.

FIG. 2 is a diagram illustrating an example of a wireless communications network. In this example, a wireless communications network 200 may include one or more wireless cells (e.g., an example of a macrocell 204 is shown in FIG. 2). The macrocell 204 may be associated with one or more base stations (e.g., base station 202). The wireless communications network 200 may also include one or more low power class base stations providing smaller coverage regions (small cells) that overlap with the macrocell 204. For example, two small cells 210 and 212 are shown in FIG. 2 respectively associated with base stations 206 and 208. The small cells may also be called as femtocells, home eNBs, pico cells, or microcells. The base stations of a macrocell and a small cell may be a scheduling entity that schedules, assigns, allocates, and/or configures resources to support communication with other wireless devices. While FIG. 2 shows no centralized controller in this example of a wireless communications network 200, a centralized controller (e.g., radio network controller (RNC), serving gateway, mobility management entity (MME), and the like) may be used in various configurations. The base stations may be responsible for all radio related functions including radio bearer control, admission control, mobility control, scheduling, security, and connectivity to a serving gateway (not shown).

The modulation and multiple access scheme employed by the wireless communications network 200 may vary depending on the particular telecommunications standard being deployed. For example, in LTE applications, OFDM is used on the download (DL) and SC-FDMA is used on the uplink (UL) to support both frequency division duplexing (FDD) and time division duplexing (TDD). As those skilled in the art will readily appreciate from the detailed description to follow, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA. UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 202, 206, and 208 may be configured to support multiple radio access technologies including those described above (e.g., 2G, 3G, 4G, licensed spectrum, and unlicensed spectrum). Throughout this disclosure, the terms cell and base station may be used interchangeably where it is appropriate. When a cell is reconfigured/configured, its base station and/or other network entities (e.g., RNC, MME, serving gateway) may be involved or reconfigured. For example, the small cell 212 (e.g., base station 208) may be configured to provide communications service to a number of wireless devices (214a, 214b, 214c) that may have different capabilities. The communications service may include voice call and data call. Non-limiting examples of device capabilities include RAT, frequency band, carrier aggregation, etc. For example, the wireless device 214a may communicate with the small cell 212 using a 3G RAT (e.g., UMTS), and the wireless device 214b may communicate with the small cell 212 using a 4G RAT (e.g., LTE). Moreover, the wireless device 214c may communicate with the small cell 212 using an unlicensed spectrum RAT (e.g., LTE-U, Wi-Fi, or Bluetooth). In various aspects of the disclosure, the small cell 212 may be configured to support one or more features (e.g., carrier aggregation) associated with each supported RAT.

However, due to cost and/or resource limitations, the small cell 212 may not have the resources to simultaneously enable all supported RATs and/or other features. That is, while the small cell 212 may be capable of supporting a number of RATs and features that the small cell 212 can support individually or as a subset, the small cell may be resource-limited to enable all supported RATs and their features at the same time. In one example configuration, the small cell 212 may be configured to support 3G (e.g., UMTS) and 4G (e.g., LTE) RATs. In another configuration, the small cell 212 may be configured to support licensed RATs (e.g., UMTS, LTE) and unlicensed RATs (e.g., LTE-U and Wi-Fi). Because the wireless devices may be mobile devices, the number and types of wireless devices associated with the small cell 212 may not be fixed and change from time to time. Therefore, a static cell configuration and resource allocation may not always be optimal when the capabilities of the wireless devices can change over time.

In accordance with aspects of the present disclosure, the resources of a wireless cell may be configured/reconfigured. This can lead to resource utilization of the cell being improved or optimized according to the capabilities of the associated wireless devices. A wireless device can be associated with the cell when the wireless device can receive communications service (e.g., voice call or data call) from the cell. The configuration/reconfiguration of the cell may be performed dynamically in response to any change of the capabilities and/or QoS requirements of wireless devices associated with the cell. Resource configuration/reconfiguration of a cell refers to the allocation/reallocation of various cell resources to provide communications service utilizing at least one or more predetermined RATs, carrier aggregation, frequency bands, bandwidth, and other features supported by the cell. For example, at a certain time of day or during operation, the cell may be configured to utilize a first resource configuration to provide communications service to the wireless devices based on their capabilities. The first resource configuration may define various features and parameters of the cell such as RATs, carrier aggregation, frequency bands, bandwidth, etc.

In various aspects of the disclosure, when the cell determines that the capabilities and/or QoS requirements of one or more associated wireless devices have changed, the cell may autonomously reconfigure to a new configuration that can improve or optimize resource utilization of the cell. In some examples, the cell may autonomously reconfigure to a new configuration when a wireless device is added/removed to/from the cell. The reconfiguration of the cell is autonomous when it is performed by the cell independent of a specific or explicit request (e.g., reconfiguration request) from the wireless devices.

In a specific example, a small cell may have two radio chains. Each of the radio chains can support five different frequency bands and two carriers in the same frequency band. The small cell may have enough resources to simultaneously support four UMTS carriers, three LTE carriers, or two UMTS carriers on the same band plus one LTE carrier. In another example, the cell may be configured to support two UMTS carriers on each of the five bands or other capabilities. However, the cell does not have the resources to support or enable all five bands at the same time. Furthermore, because the cell has only two radio chains, it cannot transmit on more than two bands at the same time. In another example, resource limitation may prevent the cell from supporting four carriers across two bands.

A small cell may determine the capabilities of the associated wireless devices using standard based or non-standard methods. For example, the UMTS and LTE standards define how a wireless cell can request a user equipment (UE) to report its communications capability to the cell. Non-standard methods may include proprietary methods that are implemented at the cell and wireless devices.

Figure 3:
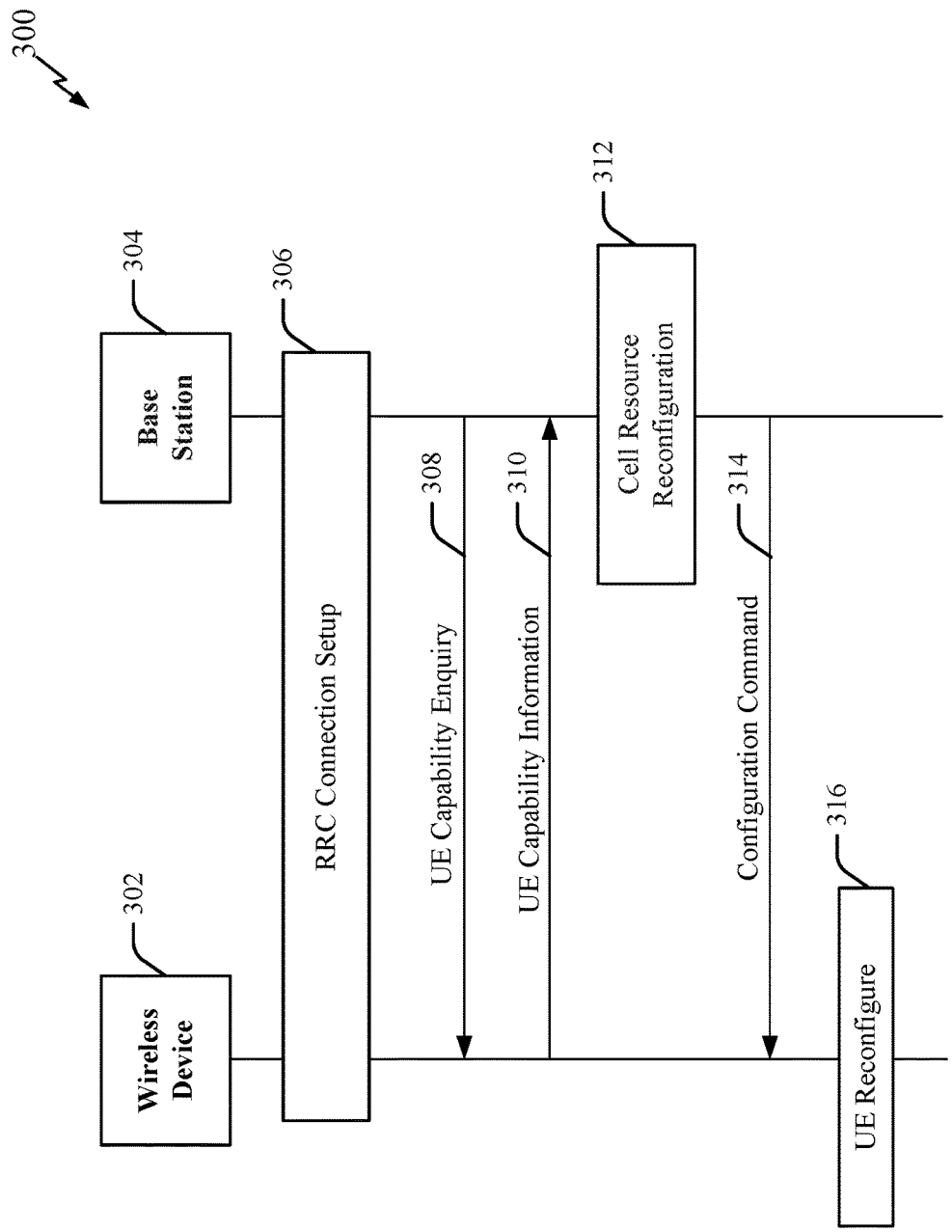
FIG. 3 is a diagram illustrating signal flows of a wireless device capability reporting procedure according to an aspect of the present disclosure.

FIG. 3 is a diagram illustrating a wireless device capability reporting procedure 300 for facilitating cell resource reconfiguration according to an aspect of the present disclosure. In some examples, the wireless device capability reporting procedure 300 may be similar to those performed in an UMTS/LTE network. Therefore, some signaling flows not essential to the understanding of the present disclosure may be omitted for brevity. A wireless device 302 may be configured to be in wireless communications with a base station 304 (e.g., Node B and eNode B). In some examples, the wireless device 302 may be a user equipment (UE), and the base station 304 may be a small cell base station. The wireless device 302 may perform a Radio Resource Control (RRC) connection setup process 306 through which the wireless device 302 selects and camps on the base station 304 as the serving cell. During the RRC connection setup process 306, the wireless device 302 and base station 304 can exchange a number of control and/or signaling messages.

In one example, the base station 304 may transmit a UE Capability Enquiry message 308 to the wireless device 302. The UE Capability Enquiry message 308 requests the wireless device 302 to report UE capability information. Non-limiting examples of the UE capability information may indicate one or more supported RATs, frequency bands, support of carrier aggregation (CA) for each RAT, and QoS requirement of the wireless device. Some examples of licensed spectrum RAT types are Evolved Universal Terrestrial Radio Access (EUTRA) and Universal Terrestrial Radio Access (UTRA). Some examples of unlicensed spectrum RAT types are Wi-Fi, Bluetooth, LTE-U, etc.

Upon receipt of the UE Capability Enquiry message 308, the wireless device 302 may transmit a UE Capability Information message 310 that indicates UE capability information as described above. For example, the UE Capability Information message 310 may include information that indicates the RAT(s), frequency band(s), CA, and QoS requirement of the wireless device 302. In response, the base station 304 may reconfigure and/or reallocate (block 312) its resources to improve or provide support for the capability and QoS requirement of the wireless device 302 based on the received capability information. In some aspects of the disclosure, the base station 304 may transmit a Configuration Command message 314 to instruct the wireless device 302 to reconfigure such that the UE's capability may match those of the reconfigured cell. The Configuration Command message 314 may include information on the current configuration (e.g., RAT, frequency band, CA) of the base station 304.

The base station 304 may perform the above-described wireless device capability reporting and cell reconfiguration process for each wireless device associated with the base station 304. For example, some or all procedures shown in FIG. 3 may be performed when a wireless device is first camped on or associated with the base station 304, and any time when the base station 304 inquires the capability of the wireless device. In some examples, the wireless devices may report different capabilities and/or QoS requirements that the base station 304 cannot support simultaneously due to resource limitations. In other aspects of the disclosure, the base station 304 and wireless device 302 may utilize other known or newly developed procedures to exchange information including UE capability and QoS requirement. The above-described wireless device capability reporting procedure 300 is different from the known RRC Connection Reconfiguration procedure defined in the 3GPP standard. The procedure illustrated in FIG. 3 and described above may also be utilized by a scheduling entity to communicate with its associated wireless devices.

Figure 4:
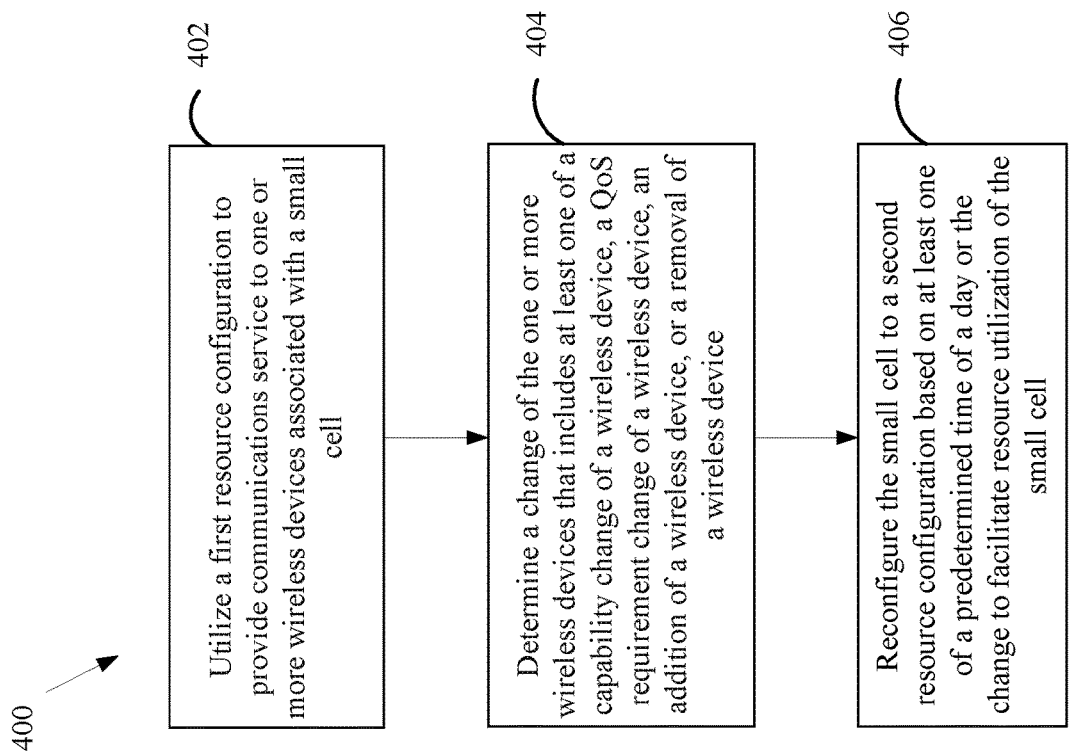
FIG. 4 is a flow chart illustrating a wireless cell reconfiguration procedure based on device capability in accordance with an aspect of the disclosure.

FIG. 4 is a flow chart illustrating a reconfiguration procedure 400 based on device capability in accordance with an aspect of the disclosure. The reconfiguration procedure 400 may be performed at a scheduling entity that can configure, assign, and/or allocate its resources to support wireless communication with one or more other wireless devices. Some non-limiting examples of the scheduling entity include a peer-to-peer (P2P) wireless device, an Internet appliance, an Internet of Things (IoT) device, an Internet of Everything (IoE) device, a router, a modem, a set-top box, home appliances (e.g., a television, a refrigerator, an alarm clock, a toaster, a washer, a dryer, a dishwasher, an oven, etc.), an automobile. In some specific examples, the scheduling entity may be a small cell (e.g., small cell 212 of FIG. 2) or a macrocell (e.g., macrocell 204 of FIG. 2). In one specific example, the reconfiguration procedure 400 may be performed by a base station of a small cell implemented as an apparatus 100 (see FIG. 1). At block 402, a small cell may utilize a first resource configuration to provide communications service to one or more wireless devices associated with the small cell. For examples, the wireless devices may be the wireless devices 214a, 214b, and 214c of FIG. 2, or other wireless devices. The first resource configuration may define the currently enabled RATs, frequency bands, CA of the cell, and other supported features.

In one aspect of the disclosure, the small cell (e.g., a base station) may utilize a resource configuration block 120 to perform a wireless device capability reporting procedure of FIG. 3 to determine the capabilities of the wireless devices associated with the cell. Based on the determined capabilities of the wireless devices, the resources of the cell may be configured to support a certain combination of RATs, frequency bands, CA, etc. Each of the wireless devices may have a corresponding QoS requirement. A QoS requirement provides a quantitative way to define the performance of a wireless network that can be obtained or desired by the wireless devices. The QoS requirement of a certain device may be specified in terms of error rate, bit rate, throughput, transmission delay, availability, jitter, etc. In an LTE example, some QoS parameters may include bearer type, priority, packet delay, packet loss, etc.

In one example, all of the wireless devices associated with the cell may be LTE-only device supporting 3 component carriers (3×) CA. In the first resource configuration, for example, the cell may reconfigure and/or allocate its resources to provide 3× CA for LTE and 1 carrier for W-CDMA such that the QoS requirements of the wireless devices may be met or exceeded. In another example, some of the wireless devices may be LTE-only device and other wireless devices may be W-CDMA only device with no CA support. Therefore, in this example, the cell may still allocate its resources to provide 3× CA for LTE and 1 carrier for W-CDMA. In some examples, depending on the capabilities of the wireless devices, multiple configurations are possible. In one example, the cell may utilize the QoS requirements of the wireless devices to determine the final configuration and resource allocation such that the QoS requirements of the wireless devices may be met.

At block 404, the cell (e.g., base station) determines a change or adjustment of the one or more wireless devices. For example, the change may be at least one of a capability change, a QoS requirement change, an addition of a wireless device, or a removal of a wireless device. The cell may utilize the resource configuration block 120 to perform the procedures described in FIG. 3 to determine changes of the wireless devices associated with the cell. If any change (e.g., capabilities, QoS requirements, addition/removal of wireless devices) is detected or indicated, the current first resource configuration of the cell may no longer be optimal or suitable based on the capabilities and/or QoS requirements of the wireless devices.

At block 406, the cell (base station) may reconfigure to a second resource configuration based on at least one of a predetermined time of a day, the capability, and/or QoS change to facilitate improved or optimal resource utilization of the wireless cell. In one example, the predetermined time may be the same or different for different days, and the predetermined time may be set based on different considerations. In one aspect of the disclosure, the cell may maintain in its memory (e.g., memory 105 of FIG. 1) a history of the wireless devices camped on the cell for a predetermined period of time (e.g., days or weeks). The history may include, for example, the capability/QoS requirement of the devices and the number of attached devices throughout different times of a day. Based on such history, the cell may determine one or more predetermined times in a day to reconfigure its resources to improve resource utilization.

The cell may reconfigure and/or reallocate its resources in a variety of manners. In one scenario this can be autonomously. That is, it can be done without receiving a reconfiguration request from the wireless devices or another cell. That is, the wireless cell (e.g., base station) may reconfigure and/or reallocate its resources without receiving a specific or explicit request (e.g., a signaling or control message) from any of the associated wireless device to perform such reconfiguration. In one example, the cell may utilize the resource configuration block 120 to perform the cell reconfiguration. In some examples, there may be no configuration that can meet the QoS requirements of all the wireless devices. Therefore, in this case, cell reconfiguration may cause some of the wireless devices to be handed off to other cells, for example, a macrocell or another small cell. In some examples, some of the wireless devices may be Internet of Things (IoT) or Internet of Everything (IoE) devices. IoT/IoE devices may have diverse capabilities (e.g., sensors, radios, etc.). Therefore, the cell may need to reconfigure when different IoT/IoE devices join and leave the cell.

Small Cell Reconfiguration Examples

The above described wireless cell reconfiguration procedure 400 may be illustrated in some small cell reconfiguration examples described below. It is assumed that a small cell is configured in a first configuration that supports two component carriers for LTE and two carriers for W-CDMA. In this example, a first wireless device (e.g., wireless device 214a, 214b, or 214c) camps or joins the small cell (e.g., cell 212). The first wireless device may support only LTE (3× CA). The first wireless device reports its capability to the small cell. At the current cell configuration, the first wireless device's QoS requirement may not be met by the cell. In this case, the small cell (or its base station) may reconfigure its resources to support three component carriers for LTE and one carrier for W-CDMA.

Later, a second wireless device (e.g., wireless device 214a, 214b, or 214c) may join the small cell while the first wireless device still camps on the cell. The second wireless device reports its capability to the small cell. For example, the second wireless device only supports W-CDMA (no CA support). In this case, the small cell may retain its current configuration that provides two carriers for W-CDMA.

Later, a third wireless device (e.g., wireless device 214a, 214b, or 214c) may join the small cell while the first and second wireless devices are still attached to the cell. The third wireless device reports its capability to the small cell. For example, the third wireless device only supports W-CDMA (2× CA). In this case, based on the capabilities of the first, second, and third wireless devices, the small cell may have more than one configuration choices. In one configuration, the small cell may reconfigure its resources to support two component carriers for LTE and two carriers for W-CDMA. In another configuration, the small cell may reconfigure its resources to support three component carriers for LTE and one carrier for W-CDMA. However, a configuration with one component carrier for LTE and three carriers for W-CDMA is not a viable option based on the wireless devices' capabilities.

When there are multiple cell configurations available, the small cell may consider the QoS requirements of the wireless devices to select a suitable (e.g., optimal) cell configuration. In one example, the selected cell configuration may meet each wireless device's QoS requirement or threshold. In general, the small cell selects a resource configuration (if possible) that can meet the QoS requirements of all associated wireless device. However, there may be some scenarios in which no configuration of the small cell can meet the QoS requirements of all attached wireless devices. In this case, the small cell may select a configuration that can meet the QoS requirements of a subset of the attached wireless devices.

Figure 5:
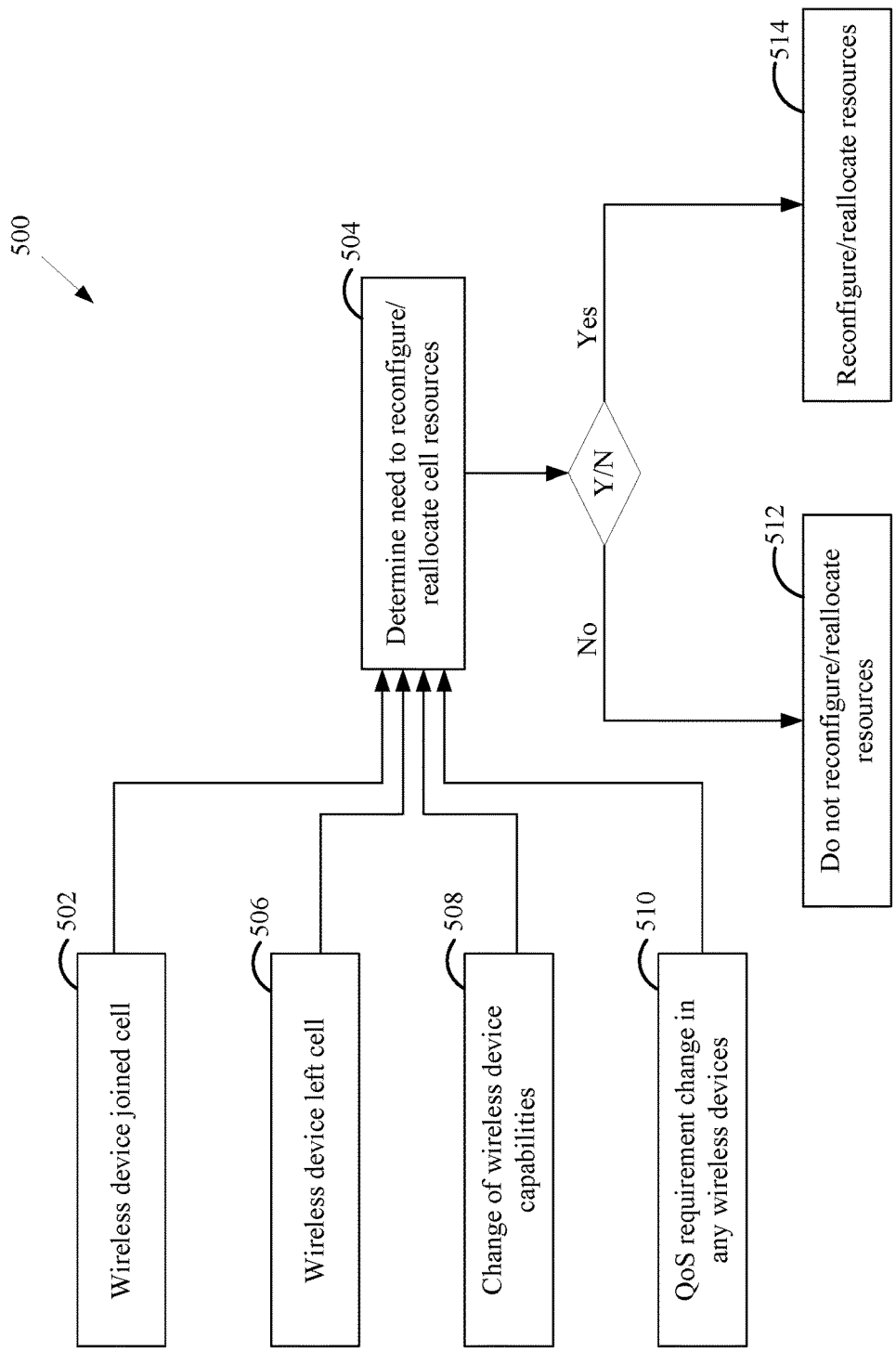
FIG. 5 is a flow chart illustrating a cell resource reconfiguration determination procedure based on changes of the wireless devices associated with the cell in accordance with an aspect of the disclosure.

FIG. 5 is a flow chart illustrating a cell resource reconfiguration determination procedure 500 based on changes of the devices associated with the cell in accordance with an aspect of the disclosure. For example, a wireless cell (e.g., a base station, eNode B, Node B, or access point) may perform the procedure 500 as part of a wireless cell reconfiguration procedure 400 (e.g., block 404 of FIG. 4) to determine whether or not cell resources reconfiguration/reallocation needs to be performed in response to changes of device capabilities and/or QoS requirements of associated wireless devices such as devices 214a, 214b, 214c illustrated in FIG. 2.

At block 502, the cell determines whether or not a new wireless device has joined to the cell. If a new wireless device has joined the cell, at block 504, the cell determines whether or not to reconfigure and/or reallocate its resources based on the capabilities and QoS requirements of the wireless devices already associated with cell and the newly joined wireless device. For example, when a wireless device 216 (see FIG. 2) moves into the coverage area of a small cell 212, the wireless device 216 may select and camp on (join) the small cell 212. The wireless device 216 may have capabilities that are the same or different from those wireless devices already camped on the cell 212, thus reconfiguration may be needed.

At block 506, the cell determines whether or not a wireless device associated with the cell has left the cell. That is the wireless device, which left the cell, is no longer camped on the cell. If a wireless device has left the cell, at block 504, the cell may determine whether or not to reconfigure and/or reallocate its resources based on the capabilities of the remaining wireless devices still associated with the cell. For example, when a wireless device 218 (see FIG. 2) moves away from the coverage area of a small cell 212, the cell may reconfigure and/or reallocate its resources.

At block 508, the cell determines a change of device capabilities among the wireless devices associated with the cell. If any of these wireless devices has a change in capabilities, at block 504, the cell may determine whether or not to reconfigure and/or reallocate its resources based on the changed (up-to-date) capabilities of the wireless devices associated with the cell. For example, one or more of the wireless devices may have enabled or disabled certain RATs, frequency bands, and/or CA. In one example, a wireless device that supports LTE but not voice over LTE (VoLTE) starts a voice call with the cell. As a result, the wireless device switches to UMTS to make the call. In this case, the cell may reconfigure or reallocate its resources to reduce LTE capabilities to support more UMTS capabilities. In another example, the user of the wireless device may manually disable/enable one or more RAT (e.g., GSM, LTE, UMTS, etc.) or frequency bands.

At block 510, the cell determines any change of QoS requirements among the wireless devices associated with the cell. If any of these wireless devices has a change in QoS requirement, at block 504, the cell may determine whether or not to reconfigure and/or reallocate its resources based on the changed QoS requirements of the wireless devices associated with the cell.

At block 512, the cell does not reconfigure and reallocate its resources if reconfiguration will not bring significant benefits (e.g., no increased performance and QoS) to the associated devices. However, at block 514, the cell reconfigures and reallocates its resources if reconfiguration will be beneficial (e.g., increased performance and QoS) to the associated devices. FIG. 5 illustrates a particular sequence of the cell resource reconfiguration determination procedure 500. In other aspects of the disclosure, the various operations of the procedure 500 may be performed in different orders or sequences. In some examples, some of the operations may be performed in parallel and/or in sequence.

Figure 6:
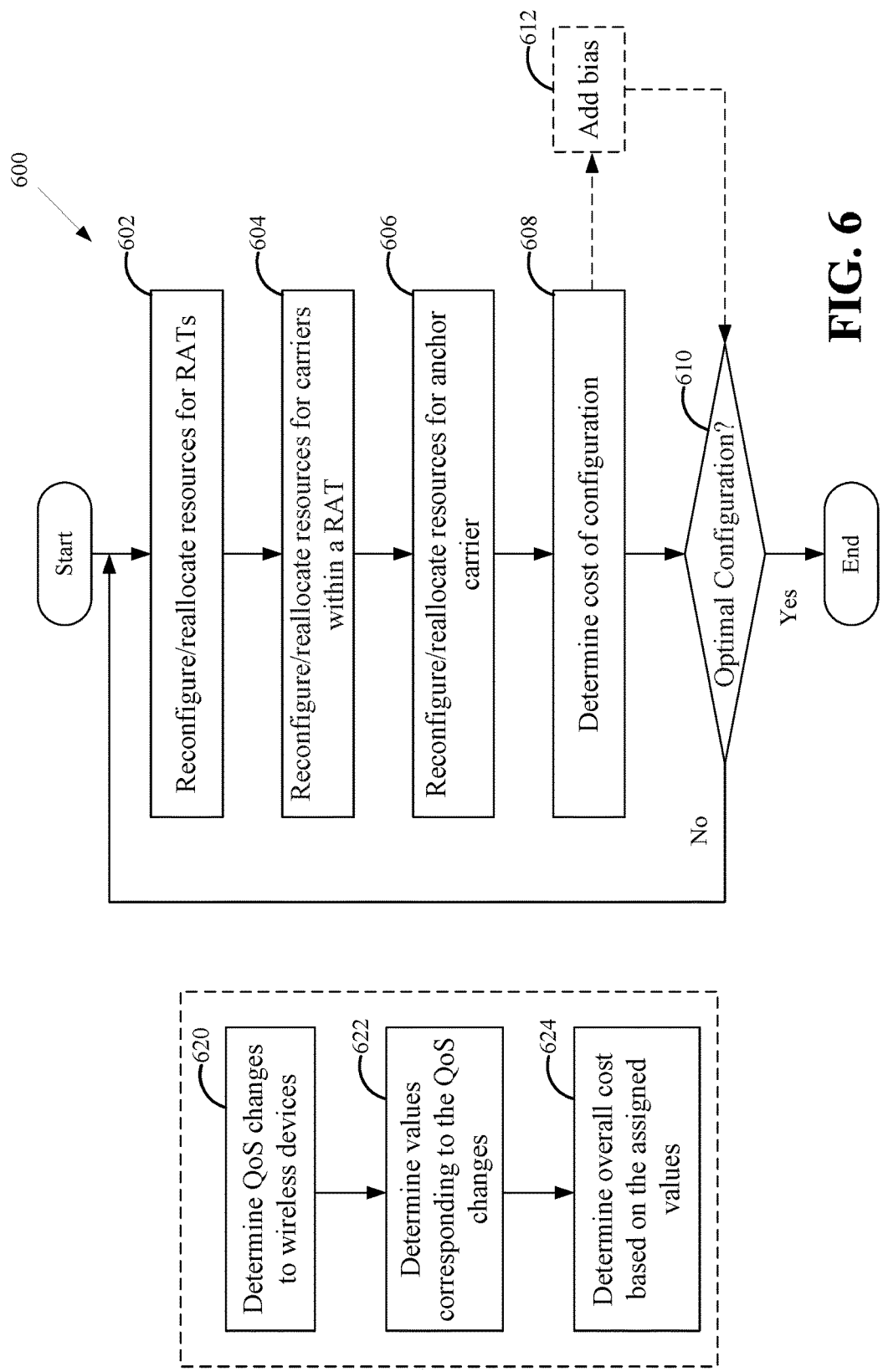
FIG. 6 is a flow chart illustrating a wireless cell resource reconfiguration and reallocation procedure in accordance with an aspect of the disclosure.

FIG. 6 is a flow chart illustrating a cell resource reconfiguration and reallocation procedure 600 in accordance with an aspect of the disclosure. In one example, the reconfiguration and reallocation procedure 600 may be performed by a small cell 212 (e.g., base station 208 of FIG. 2) while performing a wireless cell reconfiguration procedure 400 (e.g., at block 406 of FIG. 4). In one particular example, the small cell may utilize a resource configuration block 120 (FIG. 1) to perform the reconfiguration and reallocation procedure 600. By utilizing this reconfiguration and reallocation procedure 600, a wireless cell (or base station) may reconfigure and/or reallocate its resources based on the capabilities and QoS requirements of the associated wireless devices to facilitate an improved or optimal or improved resource utilization of cell resources, independent of a reconfiguration request from the associated wireless devices.

Referring to FIG. 6, at block 602, a wireless cell may reconfigure and/or reallocate its resources to enable one or more RATs supported by the associated wireless devices. In some examples, if the cell has sufficient resources, it can be configured to enable all of the available RATs supported by the wireless devices. If the cell does not have enough resources, it may be configured to enable only some of the RATs supported by wireless devices.

At block 604, the cell may reconfigure and/or reallocate its resources. This can include dynamically modifying communication network resources as desired or based on current operation circumstances. Dynamic modification can enable one or more carriers for each enabled RAT. For example, when multiple carriers are enabled for a RAT, carrier aggregation (CA) may be supported for that RAT. In a particular example, some of the associated wireless devices may support LTE CA and/or W-CDMA CA. Therefore, the cell may be configured to support LTE CA and/or W-CDMA CA in various combinations based on the available resources. In other examples, the cell may be configured to enable CA support for other RATs such as 1xEVDO, Wi-Fi, LTE-U, Bluetooth, or any RAT.

At block 606, the cell may reconfigure and/or reallocate its resources to provide an anchor carrier for one or more RATs supported by the cell. One or more anchor carriers may be provided to support different wireless devices that may not support the same RAT(s) and/or band(s). An anchor carrier is a component carrier through which a wireless device can perform cell search, synchronize with the cell, and/or obtain information from the cell. In some examples, the cell may perform signaling over the anchor carrier to add or remove component carriers, when CA is enabled, for the corresponding RAT. In an UMTS/LTE example, the cell may utilize a radio bearer reconfiguration procedure or RRC connection reconfiguration procedure to add or remove a component carrier. In some aspects of the disclosure, some operations of blocks 604 and 606 may be combined. For example, a certain carrier for a RAT may be an anchor carrier, and the resources allocated for this carrier in blocks 604 and 606 may be substantially the same. Therefore, the cell may perform resource reconfiguration/allocation to enable a carrier and an anchor carrier at the same time.

At block 608, the cell may determine the cost of a configuration or resource allocation for a particular combination of resources including RATs, CA, and anchor carrier. For example, the cost of a certain cell resource configuration may be determined 620 based on the change of QoS (QoS change) provided to all or some of the wireless devices associated with the cell. In one aspect of the disclosure, the cost of a particular configuration is a value 622 that indicates the effect on the QoS provided to the associated wireless devices when the cell's resources are reconfigured to that configuration. For example, a higher cost may indicate higher QoS degradation than that of a lower cost. Separate costs may be determined for each wireless device, and the overall cost 622 may be determined as a summation of the individual costs or other suitable ways of combining the individual costs. The individual costs may be determined using different methods or formulas.

At decision block 610, the cell determines whether or not the current configuration is optimal based on the cost of the configuration. The cost of the configuration may be compared to a threshold value. For example, the configuration may be considered optimal if the cost of the configuration is equal to or lower than the threshold value. The threshold value may be determined based on the desired reconfiguration frequency. A higher threshold value will result in less frequent reconfiguration, while a lower threshold value will cause more frequent reconfiguration. If the configuration is not optimal, the procedure 600 may be repeated until the configuration is optimal or other breakup conditions are met. Therefore, the configuration may be considered optimal when the cost of the configuration is acceptable (i.e., lowest or below the threshold) such that the resource utilization of the cell may be optimized or improved based on the capabilities and QoS requirements of the associated wireless devices. While the procedure 600 is illustrated in a particular sequence in FIG. 6, the various processes may be performed in different orders in sequence and/or parallel.

In some aspects of the disclosure, at block 612, a bias may be added to the cost to avoid frequent reconfiguration. That is, biasing the cost may reduce a likelihood of reconfiguring a cell to a new resource configuration. For example, a hysteresis (e.g., a negative bias) may be added to the cost of current configuration. In another example, an offset (e.g., a positive bias) may be added to the cost of each new configuration.

Figure 7:
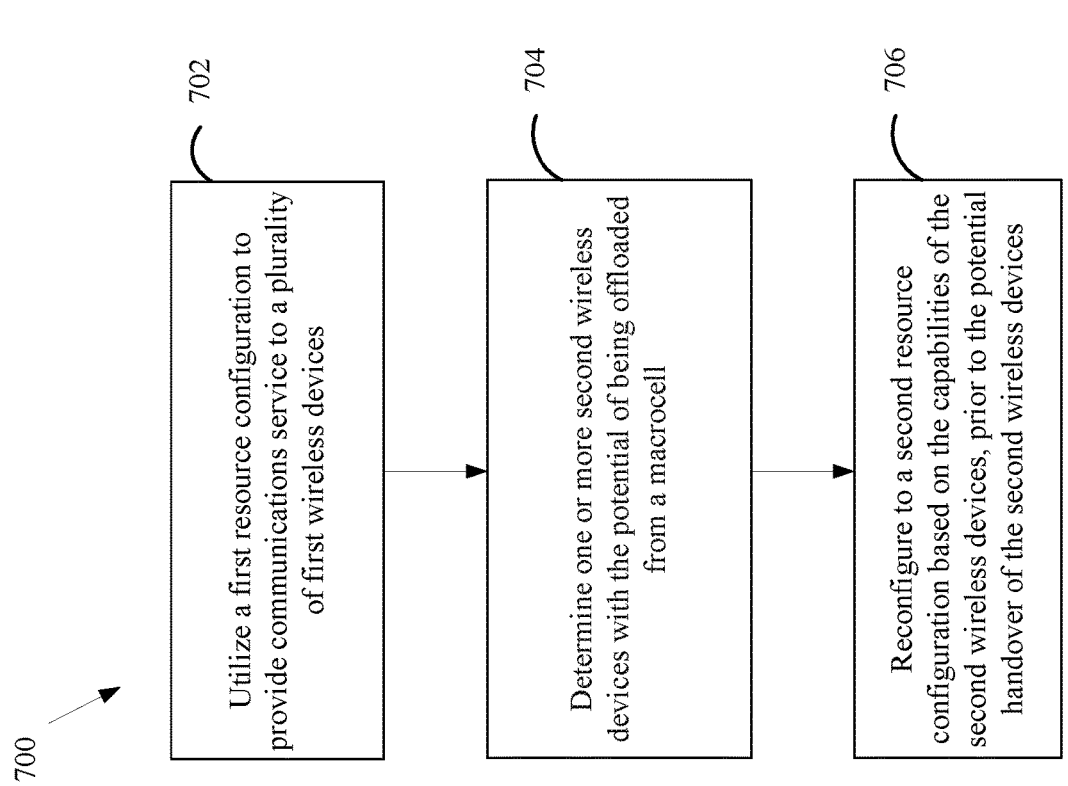
FIG. 7 is a flow chart illustrating a wireless cell reconfiguration procedure based on cell loading in accordance with an aspect of the disclosure.

FIG. 7 is a flow chart illustrating a cell reconfiguration procedure 700 based on cell loading in accordance with an aspect of the disclosure. The reconfiguration procedure 700 may be performed at a scheduling entity that can configure, assign, and/or allocate its resources to support wireless communication with one or more other wireless devices. Some non-limiting examples of the scheduling entity include a P2P wireless device, an Internet appliance, an Internet appliance, an IoT/IoE device, a router, a modem, a set-top box, home appliances (e.g., a television, a refrigerator, an alarm clock, a toaster, a washer, a dryer, a dishwasher, an oven, etc.), an automobile, etc. In one specific example, the scheduling entity is a small cell. In one example, a small cell 212 (e.g., base station 208 of FIG. 2) may utilize a resource configuration block 120 (FIG. 1) to perform the reconfiguration procedure 700. In some aspects of the disclosure, a small cell may be configured to perform both the cell loading based reconfiguration procedure 700 and the device capabilities based reconfiguration procedure 400 of FIG. 4.

At block 702, a small cell may utilize a first resource configuration to provide communications service to a plurality of first wireless devices associated with the small cell. For examples, the wireless devices may be the wireless devices 214a, 214b, 214c of FIG. 2, or other wireless devices. Based on the first resource configuration, the cell may enable the RAT(s), CA, and/or frequency bands that are supported by the wireless devices. In one example, the first resource configuration may be an optimal configuration that meets the QoS requirements of the wireless devices.

At block 704, the base station determines one or more second wireless devices that have the potential of being offloaded or handed off from a macrocell. For example, the macrocell may be the macrocell 204 of FIG. 2 that may fully or partially overlap with the small cell. These second wireless devices will be in the proximity of the small cell while still camped on the macrocell. The potential or likelihood of the second wireless devices being handed over or offloaded from the macrocell may be related to the loading of the macrocell. When a macrocell experiences heavy loading, it may hand over a wireless device to the small cell to increase available capacity and/or throughput. Because a small cell has a small footprint relative to that of a macrocell, the small cell may be able to provide more resources to the wireless device that is handed over from the macrocell.

At block 706, the small cell may reconfigure to a second resource configuration based on the capabilities of the one or more second wireless devices, prior to the potential handover of the one or more second wireless devices. For example, the small cell may reconfigure and/or reallocate its resources to enable the RAT(s), frequency band(s), and carrier aggregation suitable for the QoS requirement of the second wireless devices that may be handed over from the macrocell.

Figure 8:
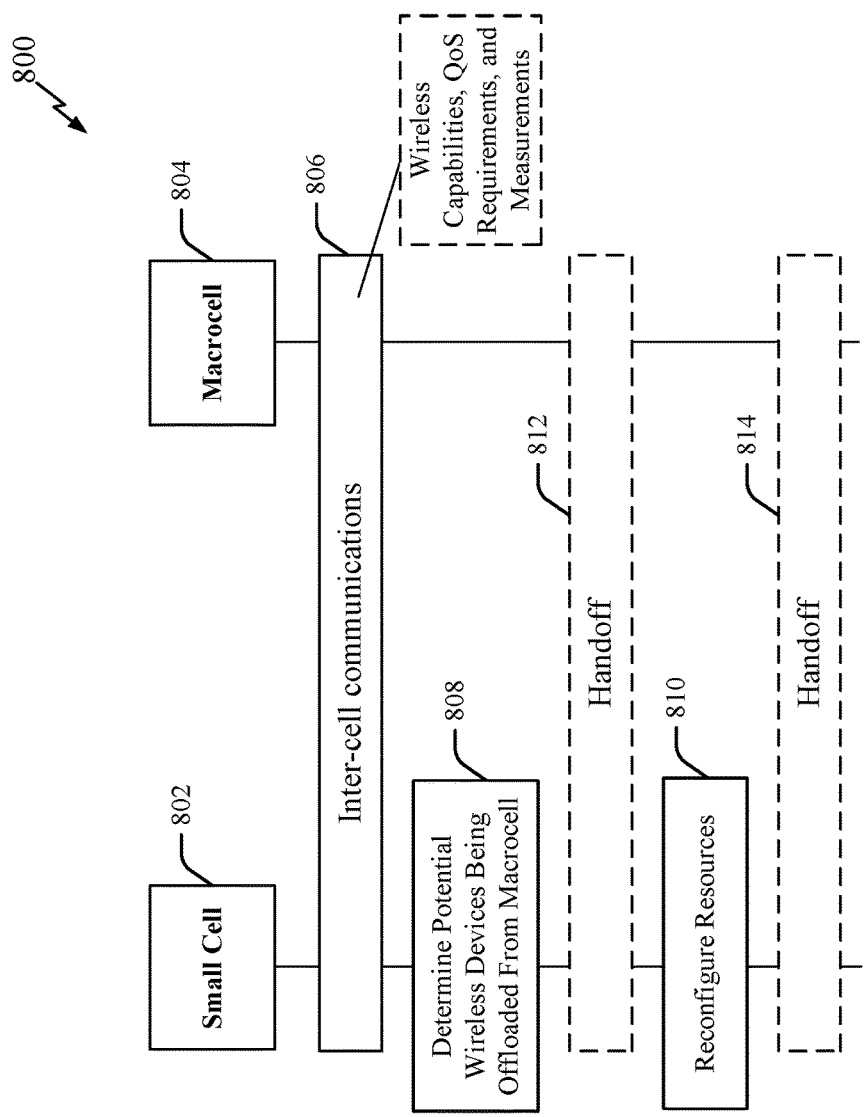
FIG. 8 is a diagram illustrating a cell loading information communications procedure in accordance with an aspect of the disclosure.

FIG. 8 is a diagram illustrating an example of the cell reconfiguration procedure 700 performed between a small cell 802 and a macrocell 804 in accordance with an aspect of the disclosure. The small cell 802 and the macrocell 804 may the same as the small cell and macrocell illustrated in FIG. 2. Referring to block 806, the small cell 802 may be in communication with the macrocell 804 to which one or more second wireless devices are camped. The macrocell 804 may provide the small cell 802 with information on specific second wireless devices that have the potential to be handed off. For example, the macrocell 804 may provide the small cell 802 with information on the capabilities of the second wireless devices that are in the proximity of the small cell 802. The macrocell 804 may also provide the signal measurements of the wireless devices to the small cell 802. The small cell 802 and the macrocell 804 may communicate via a backhaul connection between their respective base stations (e.g., base stations 202 and 208 of FIG. 2). In some examples, the macrocell 804 may transmit the information of the second wireless devices to the small cell 802 at a predetermined time or interval.

At block 808, the small cell 802 may utilize a cell loading block 130 (FIG. 1) to determine the potential wireless devices that may be handoff off or offloaded from the macrocell 804. For example, if a certain wireless device has signal measurements of the small cell 802 better than that of the macrocell 804, such wireless device may have the potential of being handed off. In some examples, the small cell 802 may also consider other factors (e.g., device capability, time of day, interference, radio channel condition) to determine the potential of the macrocell 804 offloading a wireless device.

At block 810, the small cell 802 may reconfigure its resources based on the capabilities of the wireless devices that have the potential to be handed off from the macrocell 804. In some examples, resource reconfiguration of the small cell 802 (target cell) may occur after the macrocell 804 initiates a handoff procedure 812. In some examples, the resource reconfiguration of the small cell 802 may occur before the macrocell 804 initiates a handoff procedure 814.

Figure 9:
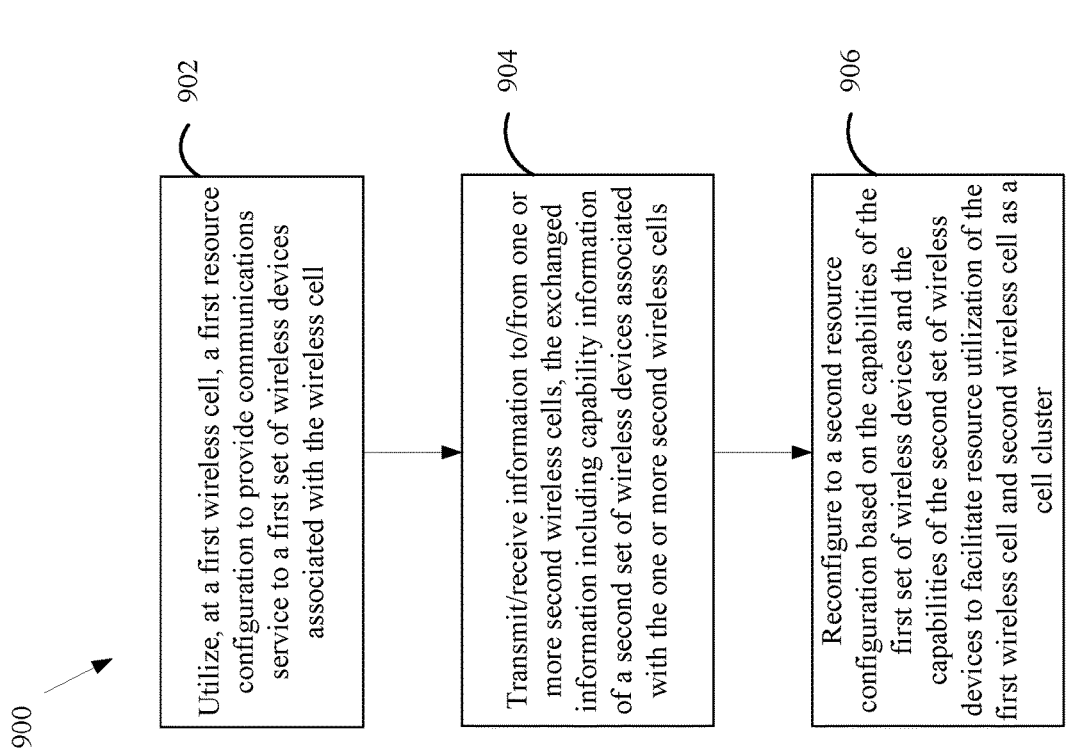
FIG. 9 is a flow chart illustrating a cell cluster reconfiguration procedure in accordance with an aspect of the disclosure.

FIG. 9 is a flow chart illustrating a cell cluster reconfiguration procedure 900 in accordance with an aspect of the disclosure. The reconfiguration procedure 900 may be performed at one or more scheduling entities that can configure, assign, and/or allocate their resources to support wireless communication with one or more other wireless devices. Some non-limiting examples of the scheduling entity include a P2P wireless device, an Internet appliance, an IoT/IoE device, a router, a modem, a set-top box, home appliances (e.g., a television, a refrigerator, an alarm clock, a toaster, a washer, a dryer, a dishwasher, an oven, etc.), and an automobile. In one specific example, the scheduling entity is a small cell, etc. In one example, the cell cluster reconfiguration procedure 900 may be performed by a cell cluster or a group of cells. A cell cluster may include two or more cells. For example, a cell cluster may include the small cells 210 and 212 of FIG. 2. In another example, the cell cluster may include a small cell and a macrocell. The cells of a cell cluster may exchange information and collectively determine a cell configuration that is improved or optimal for the wireless devices associated with the cell cluster based on the capabilities of the devices associated with the cell cluster. At block 902, a first wireless cell may utilize a first resource configuration to provide communications service to a first set of wireless devices associated with the first wireless cell. For example, the first set of wireless devices may be wireless devices 214*a*, 214*b*, and 214*c* of FIG. 2.

Figure 10:
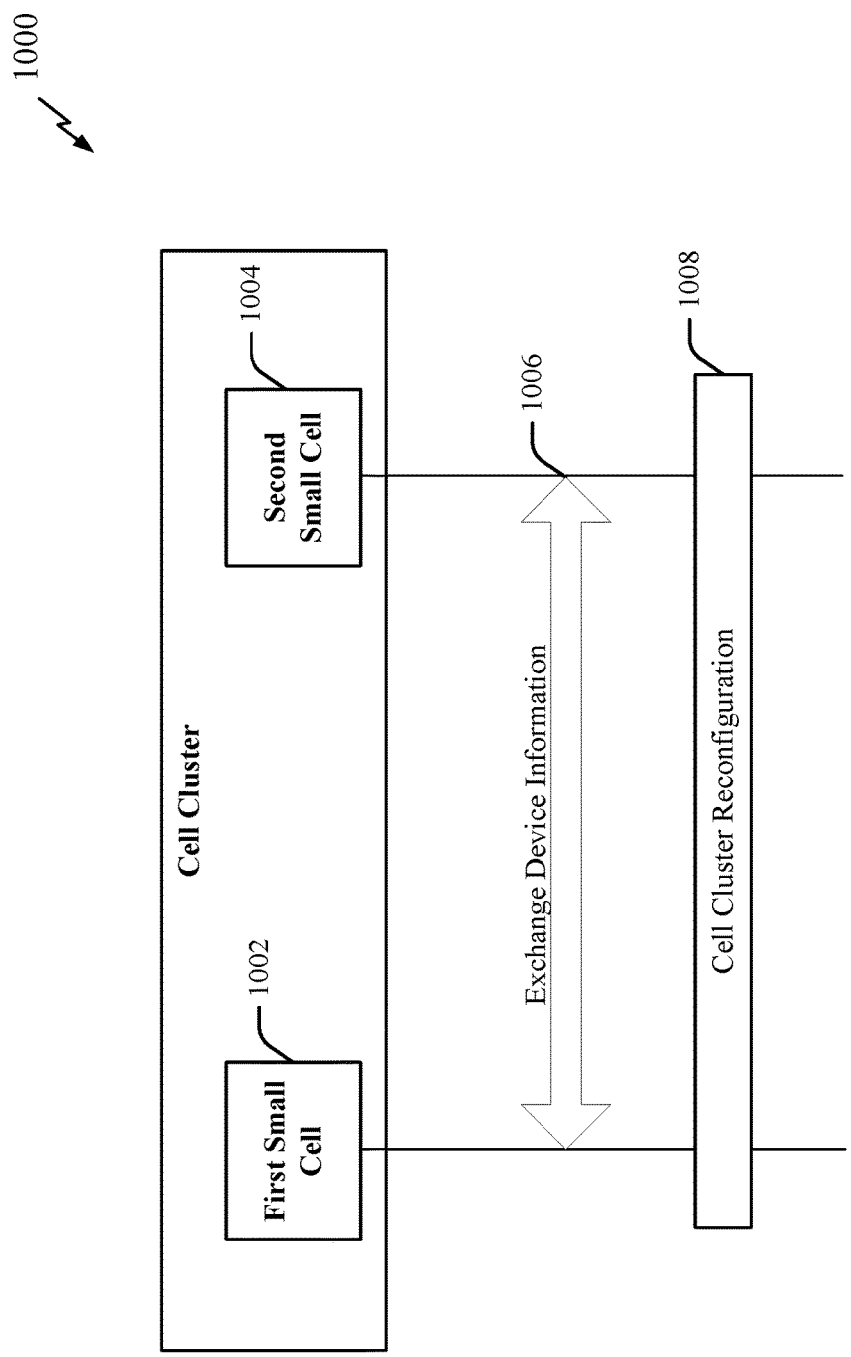
FIG. 10 is a diagram illustrating communications of a cell cluster in accordance with an aspect of the disclosure.

At block 904, the first wireless cell may exchange (transmit and receive) information with one or more second wireless cells. The communication between the cells may be carried on a wireless or wired backhaul connection. The exchanged information may be vendor specific and/or based on the implemented communication standard. The first wireless cell and second wireless cells belong to a cell cluster. The exchanged information may include the capability information of a second set of wireless devices associated with the one or more second wireless cells. In one example, the second set of wireless devices may include the wireless devices 220*a* and 220*b* FIG. 2. Referring to FIG. 10, a cell cluster may include a first small cell 1002 and a second small cell 1004. The small cells may exchange device information 1006 at a predetermined time or interval. The exchanged device information may indicate the capabilities of the associated wireless devices and their QoS requirements at each cell.

Referring back to FIG. 9, at block 906, the first cell may reconfigure to a second resource configuration based on the capabilities of the first set of wireless devices and the capabilities of the second set of wireless devices to facilitate optimal or improved resource utilization of the first and second wireless cells as a cell cluster. In this example, the first small cell 1002 may reconfigure or reallocate its resources in consideration of the capabilities of the second set of wireless devices when one or more of the second set of wireless devices are still attached to or camped on the first cell. Referring to FIG. 10, for example, the first small cell 1002 and the second small cell 1004 may jointly or collaboratively perform a cell cluster reconfiguration 1008 procedure. When the cells are configured as a cell cluster, each cell's configuration may take into account the other cell's configuration such that interference between the cells may be avoided or reduced. In the above described cell cluster reconfiguration procedure 900, a cell that is not measured by a wireless device can still be reconfigured to prepare for such wireless device before the wireless device enters the cell.

In some aspects of the disclosure, the above-described resource reconfiguration procedures may be adapted and extended to a macrocell and user equipment (UE). In some examples, resource reconfiguration may be performed at a small cell, a UE, or both the small cell and UE.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of operating a scheduling entity to facilitate resource utilization of the scheduling entity, comprising:

utilizing, at the scheduling entity, a first resource configuration of radio access technologies (RATs) and features associated with the RATs, to provide communications service to a plurality of wireless devices;

receiving a capability report from each of the plurality of wireless devices, the capability report indicating one or more supported RATs, frequency bands, and support of carrier aggregation (CA) for each RAT;

determining, based on the capability report, a capability change of the plurality of wireless devices indicating at least one of a change of the supported RATs, a change of the frequency bands, or a change of the support of CA for each RAT; and reconfiguring the scheduling entity to a second resource configuration of the RATs and features associated with the RATs, based on at least one of a predetermined time of a day or the determined capability change to meet capabilities and quality of service (QoS) requirements of the plurality of wireless devices, the reconfiguring comprising:
  determining a cost associated with the second resource configuration, wherein the cost corresponds to a QoS requirement change of one or more of the wireless devices; and
  allocating resources of the scheduling entity such that the cost is equal to or lower than a threshold value.

2. The method of claim 1, wherein the reconfiguring the scheduling entity to the second resource configuration comprises at least one of:
  enabling or disabling one or more radio access technologies (RATs);
  enabling or disabling one or more carriers for one or more RATs; or
  enabling or disabling one or more frequency bands.

3. The method of claim 1, wherein the reconfiguring the scheduling entity to the second resource configuration comprises:
  determining the QoS requirement change of one or more of the wireless devices corresponding to the second resource configuration; and
  allocating resources of the scheduling entity based on the QoS requirement change of the wireless devices.

4. The method of claim 1, wherein the reconfiguring the scheduling entity to the second resource configuration further comprises:
  allocating resources of the scheduling entity to minimize the cost.

5. The method of claim 4, further comprising:
  biasing the cost to reduce a likelihood of reconfiguring to the second resource configuration to avoid frequent reconfiguration.

6. The method of claim 1, further comprising:
  providing an anchor carrier supported by the scheduling entity,
  wherein the anchor carrier is configured to facilitate the wireless devices to at least one of perform cell search, synchronize with the scheduling entity, or obtain information from the scheduling entity.

7. The method of claim 1, wherein the reconfiguring the scheduling entity to the second resource configuration comprises:
  determining one or more potential wireless devices being handed off from a wireless cell that at least partially overlaps with a wireless cell of the scheduling entity; and
  allocating resources of the scheduling entity based on at least one or more of the capabilities of the potential wireless devices.

8. The method of claim 1, wherein the reconfiguring the scheduling entity to the second resource configuration comprises:
  transmitting first device information to a second scheduling entity, wherein the first device information comprises first capability information of the wireless devices associated with the scheduling entity, the first capability information comprising at least one of supported RATs, frequency bands, support of CA for each RAT, or QoS requirement;
  receiving second device information from the second scheduling entity, wherein the second device information comprises second capability information of one or more wireless devices associated with the second scheduling entity, the second capability information comprising at least one of supported RATs, frequency bands, support of CA for each RAT, or QoS requirement; and
  allocating resources of the scheduling entity and the second scheduling entity as a cell cluster, based on the first device information and the second device information to facilitate resource utilization of the scheduling entity and the second scheduling entity.

9. The method of claim 1, wherein the capability change of the plurality of wireless devices further comprises at least one of a quality of service (QoS) requirement change of a wireless device, an addition of a wireless device, or a removal of a wireless device.

10. A scheduling entity, comprising:
  a communication interface configured to communicate with a plurality of wireless devices;
  a memory comprising executable code; and
  a processor operatively coupled to the communication interface and the memory,
  wherein the processor is configured when executing the code, to:
  utilize a first resource configuration of radio access technologies (RATs) and features associated with the RATs, to provide communications service to a plurality of wireless devices;
  receiving a capability report from each of the plurality of wireless devices, the capability report indicating one or more supported RATs, frequency bands, and support of carrier aggregation (CA) for each RAT;
  determine, based on the capability report, a capability change of the plurality of wireless devices indicating at least one of a change of the supported RATs, a change of the frequency bands, or a change of the support of CA for each RAT; and
  reconfigure to a second resource configuration of the RATs and features associated with the RATs based on at least one of a predetermined time of a day or the determined capability change to match capabilities and quality of service (QoS) requirements of the plurality of wireless devices, the reconfiguring comprising:
    determining a cost associated with the second resource configuration, wherein the cost corresponds to a QoS requirement change of one or more of the wireless devices; and
    allocating resources of the scheduling entity such that the cost is equal to or lower than a threshold value.

11. The scheduling entity of claim 10, wherein the processor is further configured to reconfigure to the second resource configuration by at least one of:
  enabling or disabling one or more radio access technologies (RATs);
  enabling or disabling one or more carriers for one or more RATs; or
  enabling or disabling one or more frequency bands.

12. The scheduling entity of claim 10, wherein the processor is further configured to reconfigure to the second resource configuration by:
  determining the QoS requirement change of one or more of the wireless devices corresponding to the second resource configuration; and
  allocating resources of the scheduling entity based on the QoS requirement change of the wireless devices.

13. The scheduling entity of claim 10, wherein the processor is further configured to reconfigure to the second resource configuration by:
    allocating resources of the scheduling entity to minimize the cost.

14. The scheduling entity of claim 13, wherein the processor is further configured to:
    bias the cost to reduce a likelihood of reconfiguring to the second resource configuration.

15. The scheduling entity of claim 10, wherein the processor is further configured to:
    provide an anchor carrier supported by the scheduling entity,
    wherein the anchor carrier is configured to facilitate the wireless devices to at least one of perform cell search, synchronize with the scheduling entity, or obtain information from the scheduling entity.

16. The scheduling entity of claim 10, wherein the processor is further configured to reconfigure to the second resource configuration by:
    determining one or more potential wireless devices being handed off from a second wireless cell that at least partially overlaps with the scheduling entity; and
    allocating resources of the scheduling entity based on at least one or more of the capabilities of the potential wireless devices.

17. The scheduling entity of claim 10, wherein the processor is further configured to reconfigure to the second resource configuration by:
    transmitting first device information to a second scheduling entity, wherein the first device information comprises first capability information of the wireless devices associated with the scheduling entity, the first capability information comprising at least one of supported RATs, frequency bands, support of CA for each RAT, or QoS requirement;
    receiving second device information from the second scheduling entity, wherein the second device information comprises second capability information of one or more wireless devices associated with the second scheduling entity, the second capability information comprising at least one of supported RATs, frequency bands, support of CA for each RAT, or QoS requirement; and
    allocating resources of the scheduling entity and the second scheduling entity as a cell cluster, based on the first device information and the second device information to facilitate resource utilization of the scheduling entity and the second scheduling entity.

18. The scheduling entity of claim 10, wherein the capability change of the plurality of wireless devices further comprises at least one of a quality of service (QoS) requirement change of a wireless device, an addition of a wireless device, or a removal of a wireless device.

19. A scheduling entity, comprising:
    means for utilizing a first resource configuration of radio access technologies (RATs) and features associated with the RATs, to provide communications service to a plurality of wireless devices;
    means for receiving a capability report from each of the plurality of wireless devices, the capability report indicating one or more supported RATs, frequency bands, and support of carrier aggregation (CA) for each RAT;
    means for determining, based on the capability report, a capability change of the plurality of wireless devices indicating at least one of a change of the supported RATs, a change of the frequency bands, or a change of the support of CA for each RAT; and
    means for reconfiguring to a second resource configuration of the RATs and features associated with the RATs, based on at least one of a predetermined time of a day or the determined capability change to meet capabilities and quality of service (QoS) requirements of the plurality of wireless devices, the reconfiguring comprising:
        determining a cost associated with the second resource configuration, wherein the cost corresponds to a QoS requirement change of one or more of the wireless devices; and
        allocating resources of the scheduling entity such that the cost is equal to or lower than a threshold value.

20. The scheduling entity of claim 19, wherein the means for reconfiguring to the second resource configuration is configured to at least one of:
    enable or disable one or more radio access technologies (RATs);
    enable or disable one or more carriers for one or more RATs; or
    enable or disable one or more frequency bands.

21. The scheduling entity of claim 19, wherein the means for reconfiguring to the second resource configuration is further configured to:
    determine the QoS requirement change of one or more of the wireless devices corresponding to the second resource configuration; and
    allocate resources of the scheduling entity based on the QoS requirement change of the wireless devices.

22. The scheduling entity of claim 19, wherein the means for reconfiguring to the second resource configuration is further configured to:
    allocate resources of the scheduling entity to minimize the cost.

23. The scheduling entity of claim 19, further comprising:
    means for providing an anchor carrier supported by the scheduling entity,
    wherein the anchor carrier is configured to facilitate the wireless devices to at least one of perform cell search, synchronize with the scheduling entity, or obtain information from the scheduling entity.

24. The scheduling entity of claim 19, wherein the means for reconfiguring to the second resource configuration is configured to:
    determine one or more potential wireless devices being handed off from a second wireless cell that at least partially overlaps with the scheduling entity; and
    allocate resources of the scheduling entity based on at least one or more of the capabilities of the potential wireless devices.

25. The scheduling entity of claim 19, wherein the means for reconfiguring to the second resource configuration is configured to:
    transmit first device information to a second scheduling entity, wherein the first device information comprises first capability information of the wireless devices associated with the scheduling entity, the first capability information comprising at least one of supported RATs, frequency bands, support of CA for each RAT, or QoS requirement;
    receive second device information from the second scheduling entity, wherein the second device information comprises second capability information of one or more wireless devices associated with the second scheduling entity, the second capability information comprising at least one of supported RATs, frequency bands, support of CA for each RAT, or QoS requirement; and allocate resources of the scheduling entity and the second scheduling entity as a cell cluster, based on the first device information and the second device information to facilitate resource utilization of the scheduling entity and the second scheduling entity.

26. The scheduling entity of claim 19, wherein the capability change of the plurality of wireless devices further comprises at least one of a quality of service (QoS) requirement change of a wireless device, an addition of a wireless device, or a removal of a wireless device.

27. A non-transitory computer-readable medium comprising executable code for causing a scheduling entity to:
utilize a first resource configuration of radio access technologies (RATs) and features associated with the RATs, to provide communications service to a plurality of wireless devices;
receiving a capability report from each of the plurality of wireless devices, the capability report indicating one or more supported RATs, frequency bands, and support of carrier aggregation (CA) for each RAT;
determine, based on the capability report, a capability change of the plurality of wireless devices indicating at least one of a change of the supported RATs, a change of the frequency bands, or a change of the support of CA for each RAT; and
reconfigure the scheduling entity to a second resource configuration of the RATs and features associated with the RATs, based on at least one of a predetermined time of a day or the determined capability change to meet capabilities and quality of service (QoS) requirements of the plurality of wireless devices, the reconfiguring comprising:
determining a cost associated with the second resource configuration, wherein the cost corresponds to a QoS requirement change of one or more of the wireless devices; and
allocating resources of the scheduling entity to minimize the cost.

28. The computer-readable medium of claim 27, wherein the executable code causes the scheduling entity to reconfigure to the second resource configuration by at least one of:
enabling or disabling one or more radio access technologies (RATs);
enabling or disabling one or more carriers for one or more RATs; or
enabling or disabling one or more frequency bands.

29. The computer-readable medium of claim 27, wherein the executable code causes the scheduling entity to reconfigure to the second resource configuration by:
determining the QoS requirement change of one or more of the wireless devices corresponding to the second resource configuration; and allocating resources of the scheduling entity based on the QoS requirement change of the wireless devices.

30. The computer-readable medium of claim 27, wherein the executable code further causes the scheduling entity to reconfigure to the second resource configuration by:
allocating resources of the scheduling entity to minimize the cost.

31. The computer-readable medium of claim 27, wherein the executable code causes the scheduling entity to:
provide an anchor carrier supported by the scheduling entity,
wherein the anchor carrier is configured to the wireless devices to at least one of perform cell search, synchronize with the scheduling entity, or obtain information from the scheduling entity.

32. The computer-readable medium of claim 27, wherein the executable code causes the scheduling entity to reconfigure to the second resource configuration by:
determining one or more potential wireless devices being handed off from a second wireless cell that at least partially overlaps with the scheduling entity; and
allocating resources of the scheduling entity based on at least one or more of the capabilities of the potential wireless devices.

33. The computer-readable medium of claim 27, wherein the executable code causes the scheduling entity to reconfigure to the second resource configuration by:
transmitting first device information to a second scheduling entity, wherein the first device information comprises first capability information of the wireless devices associated with the scheduling entity, the first capability information comprising at least one of supported RATs, frequency bands, support of CA for each RAT, or QoS requirement;
receiving second device information from the second scheduling entity, wherein the second device information comprises second capability information of one or more wireless devices associated with the second scheduling entity, the second capability information comprising at least one of supported RATs, frequency bands, support of CA for each RAT, or QoS requirement; and
allocating resources of the scheduling entity and the second scheduling entity as a cell cluster, based on the first device information and the second device information to facilitate resource utilization of the scheduling entity and the second scheduling entity.

34. The computer-readable medium of claim 27, wherein the capability change of the plurality of wireless devices further comprises at least one of a quality of service (QoS) requirement change of a wireless device, an addition of a wireless device, or a removal of a wireless device.

* * * * *